July 31, 1956

W. R. SMITH-VANIZ, JR 2,757,336

IMPEDANCE MEASURING CIRCUIT

Filed Nov. 3, 1952

INVENTOR
WILLIAM R. SMITH-VANIZ, JR.
BY
Curtis, Morris & Safford
ATTORNEYS

July 31, 1956     W. R. SMITH-VANIZ, JR     2,757,336
IMPEDANCE MEASURING CIRCUIT
Filed Nov. 3, 1952     2 Sheets-Sheet 2

INVENTOR
WILLIAM R. SMITH-VANIZ, JR.
BY
Curtis, Morris & Safford
ATTORNEYS

United States Patent Office 2,757,336
Patented July 31, 1956

2,757,336

IMPEDANCE MEASURING CIRCUIT

William R. Smith-Vaniz, Jr., Stamford, Conn., assignor to C. G. S. Laboratories, Inc., Stamford, Conn.

Application November 3, 1952, Serial No. 318,445

14 Claims. (Cl. 324—57)

This invention is in the field of the electrical impedance measurement. The invention is in the nature of an improvement in instruments of the type disclosed by Carl G. Sontheimer in U. S. patent application Serial No. 319,089, filed November 1, 1952, and copending herewith, and assigned to the same assignee as the present application. The invention is particularly adapted for the measurement of impedances over a range of frequencies and over extended ranges of impedance values and for providing accurate measurement of impedances at low values.

A limitation on the range of low values of impedance values which can be measured in instruments of the type described in the above Sontheimer application results from the impedance in the voltage sources or in the calibrated potentiometers which affects low impedance measurements. My invention permits accurate measurement of low impedance values, thus extending the range of such instruments. Moreover, in a preferred embodiment of the present invention, multiplying factors are used whereby smaller size standard reactors can be used to measure low impedance values, and whereby these same standard reactors can be used for measuring more than one range of impedance values.

The various aspects and advantages of my invention will be in part pointed out and in part apparent from the following description considered in conjunction with the accompanying drawings, in which.

Figure 1:
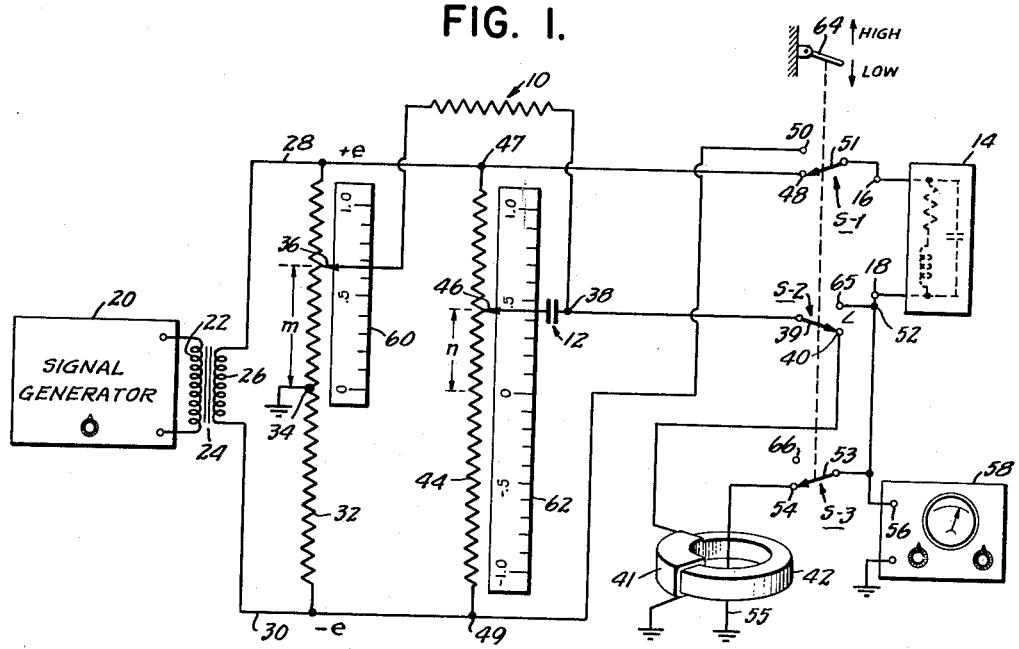
Figure 1 is a schematic diagram of the electrical circuits of an impedance measuring apparatus embodying the invention.

As shown in Figure 1, the impedance measuring circuit includes a standard resistor 10 and a standard condenser 12. In using this measuring circuit the conductance and susceptance of the unknown impedance 14, which is connected between a pair of measuring terminals 16 and 18, are compared, respectively, with the conductance and susceptance of the standard elements 10 and 12.

In order to energize the circuit, alternating voltage, for example, from a signal generator 20 tunable from 100 cycles to 100 kilocycles, is connected into the circuit through the primary winding 22 of a transformer 24 with its balanced secondary winding 26 connected by leads 28 and 30 to opposite ends of a potentiometer 32 having a mid-tap 34 connected to the common ground circuit of the instrument. Thus, the opposite ends of the potentiometer 32 are energized by alternating voltages 180° out of phase with each other and of equal magnitude, $+e$ and $-e$, respectively, from the ground.

A sliding contact 36 of the potentiometer 32 is connected through the standard resistor 10 to a common junction 38, which is connected through the movable arm 39 of a switch S-2 to the switch contact 40 and then through the primary winding 41 of a toroidal coupler or comparator 42 to the common ground circuit. A second potentiometer 44 is connected in parallel with potentiometer 32 and has a sliding contact 46 connected through the standard condenser 12 to the common junction 38. One end 47 of the potentiometer 44 is connected to the switch contact 48 of a switch S-1, and the other end of this potentiometer is connected to the switch contact 50 of this switch, having its movable arm 51 connected to the measuring terminal 16. A low impedance branch circuit extending to ground runs from terminal 16 through the unknown impedance 14 to terminal 18 and then past a measuring point 52 to the movable arm 53 of a switch S-3 with its contact 54 connected to one end of the single turn secondary 55 of the coupler 42. The other end of the secondary 55 is connected to the common ground circuit, i. e. effectively to the center tap 34 of the potentiometer 32, so that a voltage of $e$ is impressed across the low impedance circuit between the terminal 16 and ground. The measuring point 52 is connected to the input terminal 56 of an indicator 58, which, for example, may be a conventional type high impedance voltmeter responsive to the presence of alternating voltage.

In operation, the unknown impedance 14 is connected between the measuring terminals 16 and 18, and the sliding contacts 36 and 46 are adjusted until a null indication is shown by the meter 58. When this adjustment has been made, the unknown impedance is determined from the known values of the standard elements 10 and 12 and the positions of the contacts 36 and 46 on their potentiometers.

Two calibrated scales 60 and 62 are provided for determining the balanced position of the adjustable contacts. For example, the scale 60 may be calibrated with values between zero and one, which correspond to the relative resistance along the potentiometer 32 between ground and its upper end. The other scale 62 may be calibrated between $+1$ and $-1$, with the zero position corresponding to the electrical center of the potentiometer 44 and the other values corresponding to the relative resistance along the potentiometer, positive numbers corresponding to the upper half of the potentiometer nearer terminal 47 and the negative numbers corresponding to the lower half of the potentiometer nearer the terminal 49.

For purposes of explanation, the position of the adjustable contact 36 relative to the common ground circuit is expressed by the fraction $m$, as shown, and similarly the position of the contact 46 relative to the electrical center of the potentiometer 44 is expressed by the fraction $n$. Thus, a voltage of $+me$ is applied to one end of the standard resistor 10, and another voltage $ne$ is applied to one side of the condenser 12. For highest accuracy, the voltages $+me$ and $ne$ should be unaffected by changes in the magnitude of the unknown impedance 14. To a considerable extent, this can be accomplished by a suitable voltage regulating circuit, if desired; and for many applications, sufficient accuracy is obtained by using the transformer 24 in which the balanced secondary winding is of low impedance and the two potentiometers 32 and 44 are of low resistance, as explained in the above application of Carl G. Sontheimer.

In order to switch the instrument for the measurement of higher or lower ranges of impedance, a control lever 64 is provided, mechanically ganged to the switches S-1, S-2, and S-3 and arranged so that when in its upper position the circuit is adapted for the measurement of a first wide range of impedances. With the lever 64 in the upper or "high" position the operating portion of the circuit is similar to that disclosed in the above-mentioned Sontheimer application, and operates in the manner fully described therein.

When switched to the "high" range, the switch arm 51 of the switch S-1 connects a voltage of $-e$ through the contact 50 to the terminal 16 and one side of the unknown impedance 14. The switch arm 39 of the switch S-2 connects both standard elements 10 and 12 through a contact 65 to the measuring point 52, and thus disconnecting the primary winding 41 from the measuring circuit. The switch arm 53 of the switch S-3 moves from the contact 54 to the position 66 so that the secondary 55 is also removed from the measuring circuit. Thus, the voltage of the measuring point 52 becomes a function solely of the value of the impedance 14 and of the standard elements 10 and 12 and the adjustments of the contacts 36 and 46. These contacts are adjusted until a null occurs at the measuring point 52 as indicated by the meter 58. At balance, the values of the unknown conductance $g_x$ and of the unknown susceptance $b_x$ are determined, respectively, from the product of $m$ and $g$ (the conductance of the standard resistor 10) and from the product of $n$ and $b$ (the susceptance of the standard condenser 12). Thus, at balance the equations for determining $g_x$ and $b_x$ are as follows:

(1)  $g_x = mg$
(2)  $b_x = mb$

This operation is set forth in the above Sontheimer application in greater detail, and it is included here in order to explain the "high" and "low" range of operation of the circuit of Figure 1. From the Equations 1 and 2 it will be seen that when the switch 64 is in the "high" position the measurement of conductance and susceptance is made directly in terms of the conductance and susceptance of the standard elements 10 and 12.

For the measurement of low values of impedance, the large value of $b$ which would be required with the Sontheimer circuit alone, is awkward. Also, the impedance of the source 20 and of the potentiometers 32 and 44 limits the accuracy of low impedance measurements.

The "low" range is provided, whereby the same values of $b$ and $g$ can be used for the measurement of a "low" range of small impedances, and whereby the accuracy of measurement in this range is increased, thus providing an extended range of operation.

When the lever 64 is in its "low" position, the circuit is connected as shown in Figure 1 and is conditioned for the measurement of a wide range of low impedance values. The toroidal coupler 42 acts to couple or compare a first electrical effect which is a function of the unknown impedance with a second electrical effect which is a function of the values of the standard elements and of the adjustments of the potentiometers. A measurement in the "low" range is made by adjusting the potentiometers 32 and 44 until these two effects balance each other as explained in detail hereinafter to produce a null reading on the meter 58.

When in "low" adjustment a high accuracy for measurement of small impedance values is obtained, for the coupler 42 acts to raise the effective impedance of the unknown 14 which is coupled into the potentiometer circuit whereby the voltages $+e$ and $-e$ become very nearly independent of any loading effect on the generator 20 or potentiometers from the small unknown impedance 14.

The primary winding 41 of the coupler 42 preferably has a relatively large number of turns, such as 100 turns, in order to provide an extended low impedance measurement range and to reduce as much as possible any slight loading effect of the small impedance value 14 being measured. Moreover, as explained hereinafter, by using a known integral number of turns in the primary and a single turn or a known few turns for the secondary 55, a convenient scale-multiplying factor is obtained. In this embodiment, the secondary 55 comprises a single turn formed by a conductor running through the opening in the toroidal core 42. The primary 41 is energized from the junction point 38 by means of the voltage $+me$ fed through the resistor 10 and the voltage $ne$ fed through the condenser 12. The secondary 55 is energized by the voltage $+e$ fed through the low impedance circuit including the unknown 14, as mentioned above. In some instances, the switch S-1 may be omitted and the secondary circuit energized by a voltage $-e$ from the terminal 49.

When a null is produced at the measuring point 52, the relative resistances and reactances are so related that the conductance of the unknown impedance is equal to the product of the conductance of the resistor 10 and the value $m$ as indicated on the scale 60 times the turns ratio, 100, of the coupler 42. The susceptance of the unknown impedance is equal to the product of the susceptance of the condenser 12 and the value $n$ as indicated on the scale 62 times the turns ratio. Hence, the conductance $g_x$ and the susceptance $b_x$ of the unknown impedance 14 can be determined from the following equations:

(3)  $g_x = 100mg$
(4)  $b_x = 100nb$ wherein $g$ is the known conductance of the standard resistor 10 and $b$ is the known susceptance of the standard condenser 16, and $m$ and $n$ are read from the scales as indicated. It will be noted by comparing Equations 3 and 4 with 1 and 2 above that the effect of the coupler or comparator 42 is to enable the same $g$ and $b$ of resistor 10 and condenser 12, respectively, to be used for measuring $g_x$ and $b_x$, which may be 100 times as large as when the lever 64 is in the "high" position.

Figure 4:
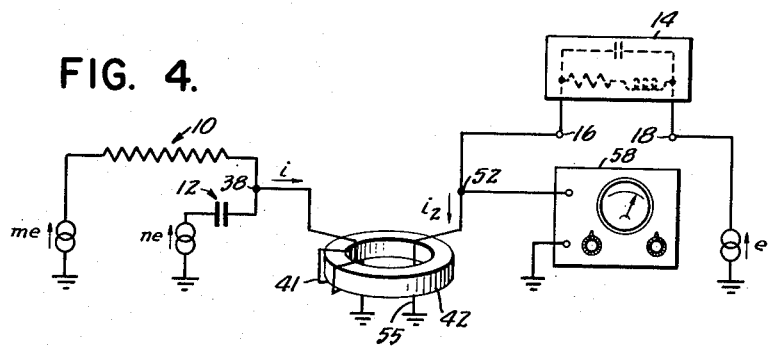
Figures 4 and 5 are partial schematic diagrams for explaining the operation of these circuits.

The operation of the coupler 42 and the remainder of the measuring circuit may be understood by a reference to Figure 4 wherein portions of the circuit under consideration are schematically shown with the voltages and currents indicated thereon. In order to simplify the description, the parts of the diagram in Figure 4 corresponding to those in Figure 1 are indicated by the same reference numerals. $me$ represents the voltage applied to standard resistor 10; $ne$ represents the voltage applied to standard condenser 12; and $e$ is the voltage applied to the unknown impedance 14, as in Figure 1.

As seen from Figure 4 a current $i_1$ is caused to flow through the primary 41 by the combined action of $me$ and $ne$. Neglecting the impedance of the winding 41, which becomes insignificant at null, the current $i_1$, may be expressed by the following equation:

(5)  $i_1 = meg + nejb$

Also, a current $i_2$ flows through the secondary 55, and similarly $i_2$ may be expressed by the following equation:

(6)  $i_2 = e(g_x + jb_x) = eg_x + ejb_x$

The windings 41 and 55 are connected in such direction that the magnetomotive forces created by the currents $i_1$ and $i_2$ are opposed in the core 42. At balance or null, the measuring point 52 drops to ground or zero potential, for the alternating flux through the winding 55 is zero, and no voltage is developed across the secondary 55.

At balance, the magnetomotive force created by the current $i_1$ must be balanced in phase and magnitude by the M. M. F. of the current $i_2$. Taking into account the turns ratio of 100:1, the right sides of Equations 5 and 6 can be equated:

(7)  $eg_x + ejb_x = 100meg + 100nejb$

From this equation, the Equations 3 and 4 above are determined. The coupler 42 acts in the nature of a magnetomotive comparator or coupler to compare the M. M. F. of a first current which is a function of the unknown impedance with a second current which is a function of the standard elements and of the adjustment of the calibrated potentiometers.

As mentioned above, one advantage of the present invention is that the coupler or comparator 42 has no effect on the balance condition of the instrument, for at null there is no alternating flux in the core 42. At balance, there is no transfer of energy from the primary 41 to the secondary 55. At balance, there is no hysteresis or eddy current loss, for there is no flux in the coupler 42. Thus, the measurement is independent of the characteristics of the coupler 42, and assuming that the coupling between the primary and secondary is substantially unity, the coupler operates in effect as if the measuring point 52 were connected to the junction 38 of the standard elements and as if the impedance of the unknown were multiplied by the first power of the turns ratio. The action of the coupler 42 differs from that of an impedance transformer in which, as is well known, the impedance transformation depends upon the square of the turns ratio.

Another advantage of my invention is that the low impedance circuit is simple and is limited to only a small portion of the over-all measuring circuit, thus enabling higher resistance potentiometers 32 and 44 to be used.

As mentioned above, one advantage of the present invention is that both an inductance and capacitance standard element are not required. Thus, the reactance element 12 may be a condenser as shown, but nevertheless the circuit can be used to measure any unknown impedance 14 whether it includes inductive or capacitive susceptance. For instance, assuming that there is capacitive susceptance between the terminals 16 and 18, then with a condenser being used for the standard element 12, the position of the contact 46 will be between the center and the upper end of potentiometer 44, that is, upon that portion of the scale 62 having positive calibration values.

With an inductive susceptance between the terminals 16 and 18, the contact 46 will be positioned at balance along the negative portion of the scale 58.

If the condenser 12 were replaced by an inductor, then the corresponding indications on the "n" scale 62 would be reversed so far as positive and negative values are concerned. For most apparatus, the use of a capacitive standard is to be preferred.

It will be noted also that the resistor 10 and the condenser 12 are fixed in value and that the potentiometers 42 and 44 are the only variable elements in the measuring circuit. These potentiometers can be calibrated readily in terms of a linear scale, thus providing an accurate and relatively inexpensive instrument.

In the circuit of Figure 1, the null condition is detected by means of the meter 58 connected to measure the voltage of the measuring point 52 in the low impedance secondary circuit containing the unknown 14. As explained above, this null occurs when the opposing M. M. F.'s in the core 42 are equal and cancel each other. Another way in which to measure the null condition is to place a tertiary winding on the core 42 responsive to the absence of flux in this core, as explained hereinafter in connection with Figure 2.

Figure 2:
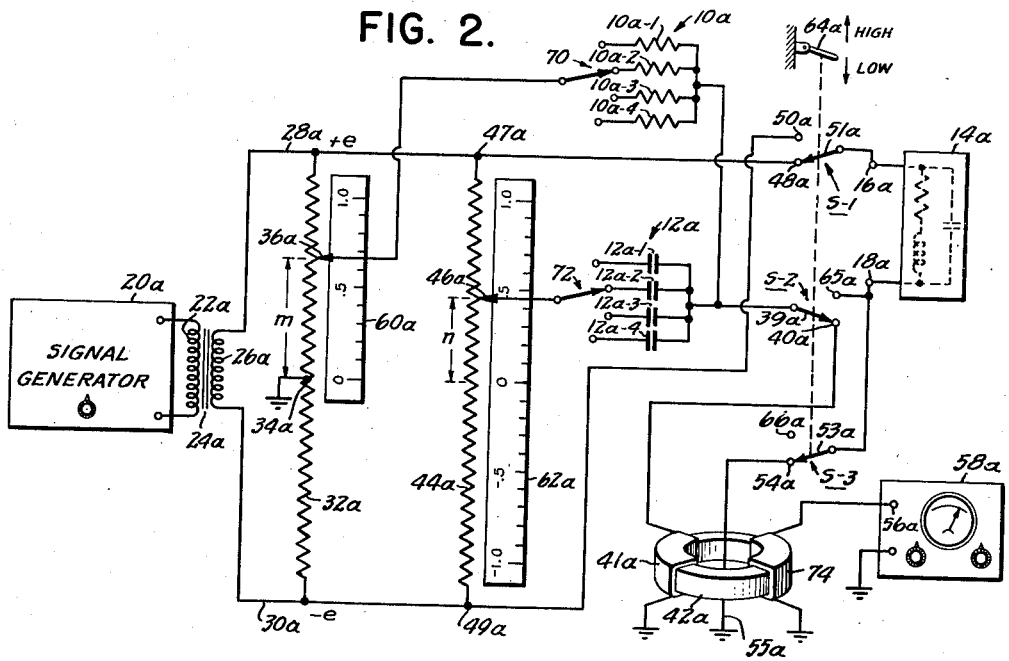
Figures 2 and 3 are similar diagrams of other embodiments of the invention.

The circuit of Figure 2 is generally similar to the circuit of Figure 1 and operates on the same fundamental principles. In order to simplify the description, certain parts of Figure 2 are indicated by the same reference numerals as in Figure 1 followed by the suffix "a" where the parts are similar and perform corresponding functions.

As in Figure 1, the alternating voltage from the signal generator 20 is applied through the transformer 24a to opposite ends of the parallel-connected potentiometers 32a and 44a. In order to extend further the operating range of the instrument, the resistance standard 10a now comprises four standard resistance elements of different values, indicated respectively at 10a-1, 10a-2, 10a-3, and 10a-4. These resistances are arranged so that any one of them can be connected into the circuit by means of a switch 70. In order to extend further the range over which susceptance can be measured accurately, a number of known condensers of different sizes indicated respectively at 12a-1, 12a-2, 12a-3, and 12a-4, are arranged so that any one of them can be connected into the circuit by means of a switch 72.

It will be apparent that suitable scales 60a and 62a calibrated to indicate directly the resistance and reactance of the unknown impedance can be provided and that the switches 70 and 72 can be ganged with suitable scale-changing mechanisms to provide a convenient, accurate, direct-reading, wide-range instrument.

In the meter circuit is a tertiary winding 74 on the core of the coupler 42a and connected to the meter terminal 56a. Preferably, the winding 74 has a relatively large number of turns in order to be highly sensitive to the presence or absence of flux in the core, and I find that a number of turns equal to those in the primary, which in this embodiment is 100 turns, is satisfactory.

The operation of the circuit in Figure 2 is similar to that of Figure 1, the contacts 36a and 46a being adjusted until a null is indicated by the meter 58a, indicating the absence of flux in the core of the coupler 42a. When this balance is obtained, the values of the unknown conductance $g_x$ and the unknown susceptance $amg_s$ are determined from the Equations 3 and 4 written above.

An advantage of the circuit of Figure 2 is that the meter 58a is responsive directly to the flux null in the coupler 42a, and hence the final reading is independent of any slight amount of leakage flux which may be associated with the primary winding 41a.

Figure 3:
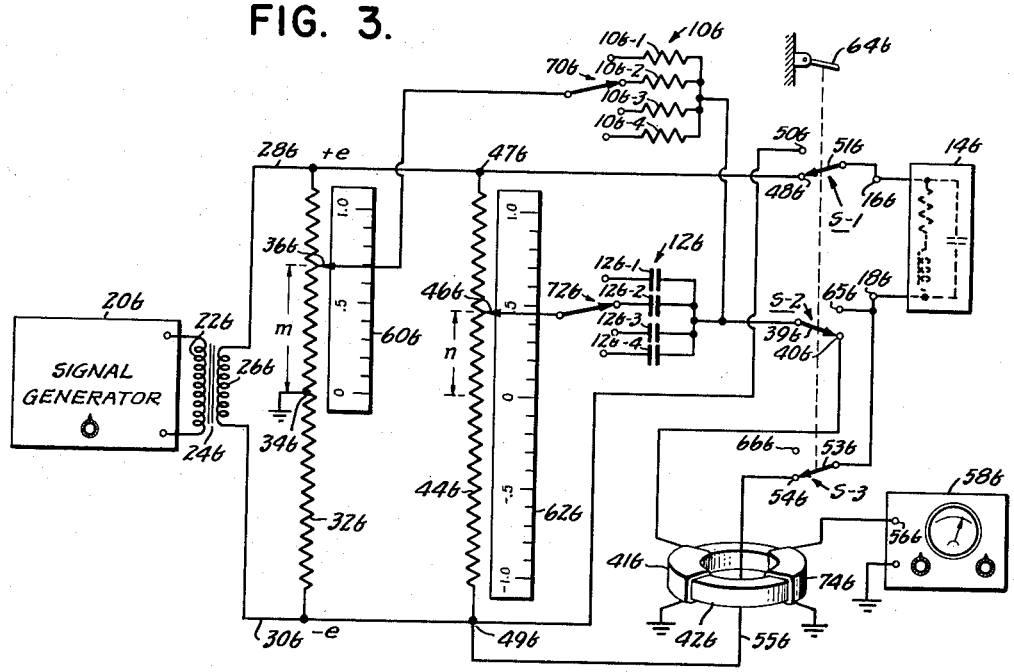

In Figure 3 is shown a schematic diagram of another measuring circuit embodying my invention. This circuit is identical with the circuit of Figure 2 except for the connection of the low impedance secondary circuit in the "low" range, as explained hereinafter.

In order to simplify the description, certain parts of Figure 3 are indicated by the same reference numerals as in Figure 2 followed by the suffix "b" where the parts are similar and perform corresponding functions. The difference, as mentioned above is in "low" range connections of the low impedance secondary circuit, which is connected from one to the other end of the parallel-connected potentiometers 32b and 44b. This secondary circuit may be traced from the terminal 47b of the potentiometer 44b to the switch contact 48b through the switch arm 51b and then from terminal 16b through the unknown impedance 14b to the terminal 18b and then through the switch arm 53b to the contact 54b and through the secondary 55b to the opposite side 49b of the potentiometer 44b. Thus, this secondary circuit is connected from $+e$ to $-e$, or in other words, a total effective voltage of $2e$ is applied thereto.

Figure 5:
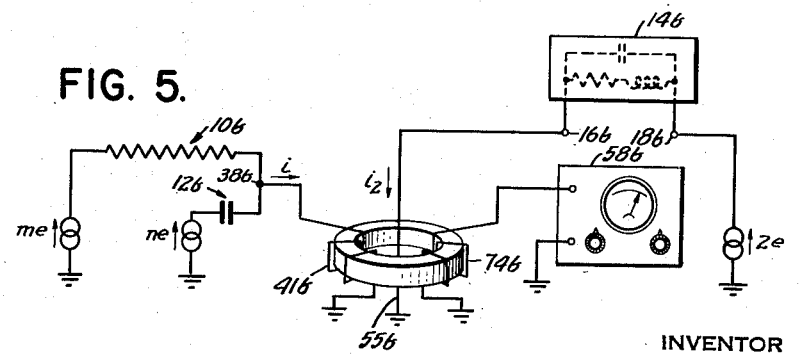

The operation of the circuit of Figure 3 may be understood by a reference to Figure 5 and a comparison thereof with Figure 4. When the circuit has been adjusted for balance, a flux null occurs in the core 42b, which is indicated by the meter 58b connected to the tertiary winding 74b, and thus, the magnetomotive forces created by currents $i_1$ and $i_2$ are equal. It will be noted that the Equation 5 applies to the primary circuit, but the following equation, which differs from Equation 6 by the presence of the factor "$2e$," applies to the secondary circuit:

(8) $\qquad i_2 = 2e(g_x + jb_x) = 2eg_x + 2ejb_x$

The right hand sides of the Equation 5 and 8 can be equated as follows, for the magnetomotive forces are equal:

(9) $\qquad 2eg_x + 2ejb_x = 100meg + 100nejb$

From Equation 9 the values of the unknown conductance $g_x$ and the unknown susceptance $b_x$ are determined:

(10) $\qquad g_x = 50meg$
(11) $\qquad b_x = 50neb$

An advantage of the circuit of Figure 3 is that any loading effect on the signal generator 20b which may be caused by the low impedance secondary circuit is applied across the whole of the parallel-connected potentiometers 32a and 44a. Thus, the effect on the voltage +e and —e is entirely balanced.

From the foregoing, it is apparent that the impedance measuring device embodying my invention is well suited to attain the ends and objects herein set forth and that it is relatively simple and inexpensive in comparison with other measuring instruments used heretofore. Certain portions of the described circuits may be used at times to advantage without a corresponding use of other parts of the circuit. It will be apparent also that many modifications of the apparatus will be made to best suit it to each particular application and that such modification may be made without exceeding the scope of my invention.

I claim:

1. An impedance measuring device for measuring the electrical values of unknown impedance elements comprising a magnetomotive comparator having a magnetizable core with primary and secondary windings thereon, first, second, and third circuit branches, circuit means coupling two of said branches to the primary winding, a standard resistance element in one of said two branches, a standard reactance element in the other of said two branches, second circuit means coupling the remaining branch to the secondary winding, first and second connecting means in said remaining branch for making electrical connection to a component of unknown impedance, first and second alternating voltage sources of the same frequency connected, respectively, to said first and second branches, a third voltage source of predeterminable magnitude connected to said third branch, alternating voltage sensing means responsive to the flux in said core, and means for independently varying the current through said branches to permit equalization of the magnetomotive forces in said comparator so that a null is produced in the voltage sensing means.

2. A null-indication type impedance measuring circuit comprising a magnetomotive comparator having a magnetizable core with primary and secondary windings thereon, first and second circuit arms connected to the primary winding, first and second alternating voltage sources of the same frequency connected, respectively, to said first and second arms, a standard resistor in one of said arms, a standard reactance element in the other of said arms, a third circuit arm connected to the secondary winding, a third voltage source of predeterminable magnitude connected to the third arm, first and second connecting means in the third arm for making electrical connection to a component of unknown impedance, alternating voltage sensing means coupled to the core and responsive to the flux in said core, and means for independently varying the current through said arms to permit equalization of the magnetomotive forces in the comparator so that a null is produced in the voltage sensing means.

3. An impedance measuring circuit for measuring the electrical values of unknown impedance elements comprising a magnetomotive comparator having a magnetizable core with primary and secondary windings thereon, first and second circuits connected to the primary windings, first and second alternating voltage sources of the same frequency connected, respectively, in said first and second circuits, a standard resistor in one of said circuits, a standard reactance element in the other of said circuits, a third circuit connected to the secondary winding, a third voltage source of predeterminable magnitude connected in the third circuit, first and second connecting means in the third circuit for making electrical connection to a component of unknown impedance, a source of reference voltage, alternating voltage sensing means coupled to the source of reference voltage and responsive to the flux in said core, and means in said first and second circuits for independently varying the current therethrough to permit equalization of the magnetomotive forces in the comparator so that a null is produced in the voltage sensing means.

4. An impedance measuring circuit comprising a magnetomotive comparator having a magnetizable core with primary and secondary windings thereon, first, second and third circuit branches, circuit means coupling two of said branches to the primary winding, a standard resistance element in one of said two branches, a standard reactance element in the other of said two branches, second circuit means coupling the remaining branch to the secondary winding, first and second connecting means in said remaining branch for making electrical connection to a component of unknown impedance, first and second alternating voltage sources of the same frequency connected, respectively, to said first and second branches, a third voltage source of predeterminable magnitude connected to said third branch, alternating voltage sensing means coupled to a portion of the third branch, and means for independently varying the current through said branches to permit equalization of the magnetomotive forces in said comparator so that a null is produced in the voltage sensing means.

5. An impedance measuring circuit comprising a magnetomotive comparator having a magnetizable core with primary and secondary windings thereon, first and second circuit arms connected to the primary winding, first and second alternating voltage sources of the same frequency and opposite phase, first and second potentiometers connected, respectively, to said first and second sources, an adjustable tap on each of said potentiometers, one of said taps being connected to each of said arms, a standard resistor in one of said arms, a standard reactance element in the other of said arms, a third circuit arm connected to the secondary winding, a third voltage source of predeterminable magnitude connected to the third arm, first and second connecting means in the third arm for making electrical connection to a component of unknown impedance, and alterating voltage sensing means responsive to the flux in said core.

6. An impedance measuring circuit as claimed in claim 5 and wherein said comparator has a tertiary winding and said sensing means is coupled to the tertiary winding.

7. An impedance measuring device for measuring the electrical values of unknown impedance elements comprising a balanceable network including a first source of alternating voltage, means for varying the magnitude of the voltage delivered by said first source, a resistance element having one of its terminals connected to said first source of voltage, a second source of alternating voltage of the same frequency as said first source, means for varying the magnitude of the voltage delivered by said second source, a reactance element having one of its terminals connected to said second source of voltage, a third source of alternating voltage of the same frequency as said first and second sources and of predeterminable magnitude, first and second connecting means for making electrical connection to an element of unknown impedance whose electrical characteristics are to be measured, first circuit means coupling the third source of voltage to the first connecting means, a magnetomotive comparator having a magnetizable core with primary and secondary windings thereon, second circuit means coupling another terminal of said resistance element and another terminal of said reactance element to said primary winding, third circuit means coupling said second connecting means to said secondary winding, and a voltage sensing device coupled to one end of the secondary winding.

8. An impedance measuring device for measuring the electrical values of unknown impedance elements comprising a balanceable network including a first source of alternating voltage, means for varying the magnitude of the voltage delivered by said first source, a resistance element connected to said first source of voltage, a second source of alternating voltage of the same frequency as said first source, means for varying the magnitude of the voltage delivered by said second source, a reactance element connected to said second source of voltage, a third source of alternating voltage of the same frequency as said first and second sources and of predeterminable magnitude, first and second connecting means for making electrical connection to an element of unknown impedance whose electrical characteristics are to be measured, first circuit means coupling the third source of voltage to the first connecting means, a magnetomotive comparator having a magnetizable core with primary, secondary, and tertiary windings thereon, second circuit means coupling said resistance element and said reactance element to said primary winding, third circuit means coupling said second connecting means to said secondary winding, and a voltage sensing device coupled to one end of the tertiary winding.

9. An impedance measuring circuit comprising a coupler having a magnetizable core and primary and secondary windings thereon, first and second arms coupled to the secondary, said first arm including a reactance standard and means for incrementally adjusting said reactance standard, said second arm including a resistance standard and means for incrementally adjusting said resistance standard, a third arm including a pair of measuring terminals between which an unknown impedance element can be connected, a common ground circuit, a generator of alternating voltage having a first terminal supplying a voltage of controllable frequency, variable resistance means for adjusting the magnitude of said voltage connected between said terminal and said first arm, said generator having a second terminal supplying a voltage of the same frequency and of opposite phase, a potentiometer connected between said terminals, an adjustable contact on said potentiometer connected to said second arm, a calibrated scale associated with said contact, circuit means coupling said third arm to the secondary, and alternating voltage null sensing means coupled to said core.

10. An impedance measuring circuit comprising first, second, and third circuit arms, said first arm including a resistance standard element, said second arm including a reactance standard element, said third arm including a pair of measuring terminals between which an unknown impedance element can be connected, a magnetizable core having primary and secondary windings thereon, a common ground circuit, a generator of alternating voltage of controllable frequency having first and second terminals supplying alternating voltage of opposite phase with respect to said ground circuit, first and second potentiometers connected between said supply terminals, the first potentiometer having a centertap connected to the common ground circuit, a first adjustable contact on said first potentiometer and being connected to said first arm, a second adjustable contact on said second potentiometer and being connected to said second arm, circuit means coupling said first and second circuit arms to the primary and said third circuit arm to the secondary, means connecting said third arm to one of said generator terminals, and an alternating voltage sensing means responsive to the flux in said core.

11. An impedance measuring circuit comprising a first, second, and third arm, said first arm including a conductance standard, said second arm including a susceptance standard, said third arm including a pair of measuring terminals between which an unknown impedance element can be connected, a source of alternating voltage having a first terminal supplying a voltage controllable frequency and of predetermined phase, means for adjusting the magnitude of said voltage connected between said terminal and said first arm, said source having a second terminal supplying a voltage of the same frequency and of opposite phase, a potentiometer connected between said terminals, an adjustable contact on said potentiometer connected to said second arm, a calibrated scale associated with said contact, means connecting the third arm to a voltage of the same frequency and of fixed magnitude, a coupler having a magnetizable core and primary and secondary windings, circuit means coupling said first and second arms to the primary, means connecting the third arm to the secondary, and alternating voltage null sensing means responsive to the flux in said core.

12. An impedance measuring circuit comprising first, second, and third circuit arms, said first arm including a resistance standard element, said second arm including a reactance standard element, said third arm including a pair of measuring terminals between which an unknown impedance element can be connected, a common ground circuit, a generator of alternating voltage of controllable frequency having first and second terminals supplying alternating voltage of opposite phase with respect to said ground circuit, first and second potentiometers connected between said supply terminals, the first potentiometer having a centertap connected to the common ground circuit, a first adjustable contact on said first potentiometer and being connected to said first arm, a second adjustable contact on said second potentiometer and being connected to said second arm, first circuit means connecting said third arm to a source of voltage of predeterminable magnitude with respect to the common ground circuit, a magnetizable core having primary and secondary windings thereon, second circuit means connecting said first and second arms to the primary, third circuit means connecting said third arm to the secondary, and an alternating voltage sensing means responsive to the flux in said core.

13. An impedance measuring circuit comprising first, second, and third circuit arms, said first arm including a resistance standard element and means for incrementally changing the magnitude of said element, said second arm including a reactance standard element, and means for incrementally changing the magnitude of said resistance element, said third arm including a pair of measuring terminals between which an unknown impedance element can be connected, a common ground circuit, a generator of alternating voltage of controllable frequency having first and second terminals supplying alternating voltage of opposite phase with respect to said ground circuit, first and second potentiometers connected between said supply terminals, the first potentiometer having a centertap connected to the common ground circuit, a first adjustable contact on said first potentiometer and being connected to said first arm, a second adjustable contact on said second potentiometer and being connected to said second arm, first circuit means connecting said third arm to one of the generator terminals, a magnetizable core having primary and secondary windings thereon, second circuit means connecting said first and second arms to the primary, third circuit means connecting said third arm to the secondary, and an alternating voltage sensing means responsive to the flux in said core.

14. An impedance measuring circuit as claimed in claim 13 and wherein said core has a tertiary winding thereon and said sensing means is coupled to the tertiary winding.

References Cited in the file of this patent

UNITED STATES PATENTS

| | | |
|---|---|---|
| 2,109,325 | Thal | Feb. 22, 1938 |
| 2,551,337 | Roberts | May 1, 1951 |